United States Patent
PalChaudhuri et al.

(10) Patent No.: US 9,854,391 B2
(45) Date of Patent: Dec. 26, 2017

(54) ZERO TOUCH CONFIGURATION SUPPORT FOR UNIVERSAL SERIAL BUS MODEM ON A NETWORK DEVICE

(71) Applicant: Aruba Networks, Inc., Sunnyvale, CA (US)

(72) Inventors: Santashil PalChaudhuri, Bangalore (IN); Jagachittes Vadivelu, Bangalore (IN); Sandeep Yelburgi, Bangalore (IN); Guojun Zhang, Beijing (CN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 236 days.

(21) Appl. No.: 14/446,548

(22) Filed: Jul. 30, 2014

(65) Prior Publication Data

US 2016/0036634 A1    Feb. 4, 2016

(51) Int. Cl.
*G06F 15/177*    (2006.01)
*H04W 4/02*    (2009.01)
*H04L 12/24*    (2006.01)

(52) U.S. Cl.
CPC .......... *H04W 4/02* (2013.01); *H04L 41/0809* (2013.01); *H04L 41/12* (2013.01)

(58) Field of Classification Search
CPC .......... H04L 63/0492; H04L 41/0813; H04W 88/18; H04W 88/02; H04W 48/00; H04W 48/18
USPC ................................................ 709/221, 224
See application file for complete search history.

(56) References Cited

U.S. PATENT DOCUMENTS

| 6,453,024 B1* | 9/2002 | Baker | H04M 11/06 375/222 |
|---|---|---|---|
| 8,537,715 B1* | 9/2013 | Vadivelu | H04L 12/5692 370/252 |
| 2008/0076398 A1* | 3/2008 | Mate | C03C 17/09 455/414.2 |
| 2009/0270099 A1* | 10/2009 | Gallagher | H04W 8/08 455/435.1 |
| 2011/0199964 A1* | 8/2011 | Karaoguz | H04W 64/003 370/328 |
| 2014/0023041 A1* | 1/2014 | Zhao | H04W 36/14 370/331 |
| 2014/0243013 A1* | 8/2014 | Liu | H04W 64/003 455/456.1 |
| 2014/0304207 A1* | 10/2014 | Chandrayana | H04L 29/08072 706/48 |
| 2014/0348176 A1* | 11/2014 | Sprague | H04L 49/35 370/401 |

* cited by examiner

*Primary Examiner* — Hitesh Patel
(74) *Attorney, Agent, or Firm* — Hewlett Packard Enterprise Patent Department

(57) ABSTRACT

Zero touch configuration support for a universal serial bus (USB) modem is described herein. For example, as described herein, an identifier of a modem connected to an access point may be determined. Location information corresponding to the access point may also be determined. Based on the identifier of the modem and the location information, the access point may select a particular configuration, for the modem, where the particular configuration is suitable for a geographical location associated with the location information.

19 Claims, 6 Drawing Sheets

| ISP 200 | COUNTRY 210 | MODEL 220 | PROVISIONING PARAMETERS 230 |
|---|---|---|---|
| AT&T | US | Huawei E170 | usb_type=option (2) usb_init=AT+CGDCONT=1,'IP','wap.cingular' usb_dial=ATDT*99***1# |
| AT&T | US | Sierra 308 | usb_type=4 (sierra-gsm) usb_dev=0x0f3d68a3 usb-dial=ATDT*99***1# usb_tty=ttyUSB6 usb_init=AT+CGDCONT=1,'IP','isp.cingular' |
| O2 | UK | Huawei E160 | usb_user=O2web usb_passwd=password usb_type=option (2) usb_dev=0x12d11003 usb_dial=ATDT*99***1# usb_init=AT+CGDCONT=1,'IP','mobile.o2.co.uk' |
| Mobinil | Egypt | ZTE MF190 | usb_type=airprime (1) usb_dev=0x19d20033 usb_modeswitch="-v 0x19d2 -p 0x0033 -d" usb_tty=ttyUSB4 usb_init=AT+CGDCONT=1,'IP','mobinilweb' usb_dial=ATDT*99# |
| True | Thailand | ZTE MF190 | usb_type=option (2) usb_dev=0x19d20117 usb_tty=ttyUSB2 usb_init=AT+CGDCONT=1,'IP','internet' usb_dial=ATDT*99# |
| Telstra | Australia | Sierra 308 | usb_dev=0x119968a3 usb_dial=ATDT*99***1# usb_init=AT+CGDCONT=1,'IP','telstra.internet' usb_tty=ttyUSB6 usb_type=4(sierra-gsm) |
| SFR | France | Huawei E160 | usb_type=option (2) usb_dev=0x12d11003 usb_dial=ATDT*99***1# usb_init=AT+CGDCONT=1,'IP','websfr' |
| ... ... | ... ... | ... ... | ... ... |

FIG. 2

| ISP 300 | COUNTRY 310 | COUNTRY CODE 320 |
|---|---|---|
| AT&T | UNITED STATES | 310038 |
| AT&T | UNITED STATES | 310090 |
| AT&T | UNITED STATES | 310150 |
| AT&T | UNITED STATES | 310170 |
| AT&T | UNITED STATES | 310410 |
| AT&T | UNITED STATES | 310560 |
| AT&T | UNITED STATES | 310680 |
| O2 | UNITED KINGDOM | 234 02 |
| O2 | UNITED KINGDOM | 234 10 |
| O2 | UNITED KINGDOM | 234 11 |
| Mobinil | EGYPT | 602 01 |
| True Move | THAILAND | 520 99 |
| Telstra | AUSTRALIA | 505 01 |
| Telstra | AUSTRALIA | 505 11 |
| Telstra | AUSTRALIA | 505 71 |
| Telstra | AUSTRALIA | 505 72 |
| SFR | FRANCE | 208 10 |
| SFR | FRANCE | 208 11 |
| SFR | FRANCE | 208 13 |
| ... ... | ... ... | ... ... |

FIG. 3

ZERO TOUCH CONFIGURATION SUPPORT FOR UNIVERSAL SERIAL BUS MODEM ON A NETWORK DEVICE

FIELD

Embodiments of the present disclosure relate to network configuration management. In particular, embodiments of the present disclosure describe a method and network device for zero touch configuration support for universal serial bus (USB) modem on a network device.

BACKGROUND

For a USB modem to connect successfully to a network, several parameters are required to enable the USB modem to connect to the Internet Service Provider (ISP). The followings are a few exemplary parameters: subtype, usbinit, usbmodeswitch, usbtty, usbuser, usbpasswd, usbdial, etc. Conventionally, each USB modem parameter is configured by a network administrator when the USB modem initially connects to an access point (AP) in a wireless local area network (WLAN). Accordingly, when a new and different USB modem is connected to the AP, the network administrator will need to erase the old USB modem configuration parameters, replace them with the new USB modem configuration parameters as related to the new USB modem.

It could be challenging for the network administrator to remember the configuration parameter values. Also, such manual configuration is prone to configuration mistakes, which may lead to inefficiency, e.g., from excessive debugging time. Moreover, it could be more difficult when the network administrator manages multiple different USB modems, because he/she will need to re-configure the USB modem parameters each and every time.

Previously, this was solved by detecting the modem device's identifier from the plugged-in device, and using the identifier as a key to configure all parameters statically. This feature takes away the hassle of any manual intervention for all supported modems, and thus allowing for a zero touch configuration.

Nevertheless, due to the introduction of new Internet modems, new vendors, and new device types to the market over time, more USB modems of the same type are being used by different countries and/or different ISPs. Therefore, a network needs to maintain multiple entries for each ISP with a unique entry per country. As the parameters needed for bringing up the USB modem become dependent on the ISP and/or country code, the aforementioned process no longer provides zero touch configurations for several such ISPs and/or countries during network deployment. Therefore, a user would need to manually configure the ISP and country for each USB modem.

DETAILED DESCRIPTION

In the following description, several specific details are presented to provide a thorough understanding. While the context of the disclosure is directed to network configuration management, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

FIG. 2 shows an exemplary table illustrating various ISP, country, model and their corresponding provisioning parameters according to embodiments of the present disclosure.

FIG. 3 shows an exemplary table illustrating selected International Mobile Subscriber Identity (IMSI) code according to embodiments of the present disclosure.

OVERVIEW

Embodiments of the present disclosure relate to network configuration management. In particular, embodiments of the present disclosure describe a method and network device for zero touch configuration support for universal serial bus (USB) modem on a network device.

With the solution provided herein, an access point determines an identifier of a network device connected to the access point, and location information corresponding to the access point. Based at least on the identifier of the network device and the location information corresponding to the access point, the access point selects a particular configuration, of a plurality of configurations, for the network device. Specifically, the particular configuration selected for the network device is suitable for a geographical location associated with the location information.

Network Environment

Figure 1:
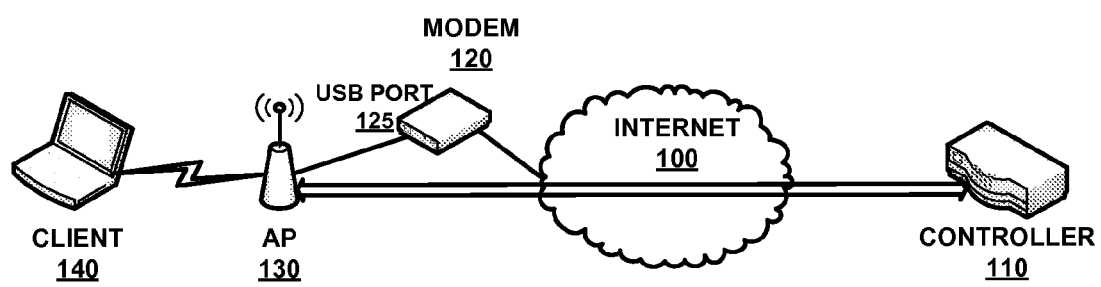
FIG. 1 shows an exemplary network environment according to embodiments of the present disclosure.

FIG. 1 shows an exemplary network environment according to embodiments of the present disclosure. Specifically, FIG. 1 illustrates a network that includes at least a controller 110, a modem 120, an access point 130, a client device 140, etc.

Controller 110 generally refers to a network controlling device that manages other network devices such as wireless access points. Controller 110 may handle automatic adjustments to radio frequency power, wireless channels, wireless authentication, and/or security. Furthermore, Controller 110 can be combined to form a wireless mobility group to allow inter-controller roaming. Controller 110 can be part of a mobility domain to allow clients access throughout large or regional enterprise facility locations. This saves the clients time and administrators overhead because it can automatically re-associate or re-authenticate.

Modem 120 generally refers to a device that modulates an analog carrier signal to encode digital information and demodulates the signal to decode the transmitted information. The goal is to produce a signal that can be transmitted easily and decoded to reproduce the original digital data. Specifically, modem 120 can be a USB wireless modem that uses a USB port 125 to provide cellular wireless access to a client.

Access points, e.g., AP 130, generally refer to a set of wireless network devices that allow wireless client devices to connect to a wired network using IEEE 802.11 or related standards. The APs usually connect to a router via a wired network, but can also be an integral component of the router itself. An access point, e.g., AP 130, may be located remote to a central controller, e.g., Controller 110. Such an access point is also referred to as a remote access point (RAP). When a network includes a RAP, a secure communication tunnel may be established between the RAP and the controller for secured network communications in a wireless local area network (WLAN).

A Remote Access Point (RAP) often supports multiple types of uplinks that provide connections to the Internet for the RAP. For example, the RAP can use various multi-mode USB modems for providing additional uplink connection. The modes supported by the USB modem 120 may include, but are not limited to, a 2G network mode, a 3G network mode, a 4G/LTE network mode, etc. Each mode of the multi-mode USB modem requires a set of unique provisioning parameters to be supplied by a network administrator to configure the USB modem for connecting to Internet 100. USB modem parameters may include, but are not limited to, Pre-Device ID, Post-Device ID, subtype, usbinit, usbmodeswitch, usbtty, usbuser, usbpasswd, usbdial, etc. Thus, the network administrator needs to remember the parameters and their values in order to provision a USB modem to connect to the uplink network (e.g., Internet 100).

In some embodiments, an AP may simplify the USB modem provisioning process by storing the USB modem parameters as a part of the AP's flash memory. For example, the AP can maintain a list of supported modems with all the configuration details, such as, Pre-device ID, Post Device ID, subtype, usbinit, usbmodeswitch, usbtty, usbuser, usbpasswd, usbdial, etc. Therefore, based on the Device ID of a particular USB modem, the AP can uniquely identify the corresponding configuration parameters for the particular USB modem. Hence, any USB modems supported by the AP will connect to the Internet without manual input of any additional parameters (i.e., the USB modem will achieve zero-touch configuration for its operation). From a user's perspective, the user can simply plug-and-play the supported USB modem to the AP's USB port without the need to provide any additional modem configuration parameters.

Furthermore, each access point serves one or more client devices. For example, client device 140 is associated with AP 130. A client device (also referred to as a "station" or "STA") is a device that has the capability to use the IEEE 802.11 protocol. For example, a client device may be a laptop, a desktop computer, a personal data assistant, a smartphone, etc. An STA may be fixed, mobile, or portable. The term "station," "wireless client," "client device," etc., are used interchangeably in the present disclosure. Given that AP 130 is connected to modem 120 via USB port 125 and that modem 120 is configured automatically by stored parameters on AP 130, any client devices (e.g., client device 140) associated with AP 130 will be connected to Internet 100 automatically through AP 130.

USB Modem Provisioning

Provisioning generally refers to the process of preparing and equipping a network device (such as a USB modem) to allow the network device to provide new services to its users and/or clients. Typically, USB modems are uniquely identified by their device identifiers, which can be either a pre-device-id or a post device-id. Pre-device-id generally refers to the device identifier before mode-switch, which switches the device to function as a wireless modem from a storage USB device. After mode-switch, the device identifier is then referred to as post-device-id. The post-device-id is what the USB modem uses to identify itself during its operational mode.

An AP can use the pre-device-id of the USB modem to retrieve the USB parameter from the supported list stored in the flash memory of the AP. For example, when a USB modem is plugged-in to a USB port of the AP, the AP can obtain the pre-device-id of the USB modem through the USB interface. The pre-device-id can then be used by the AP to uniquely identify other USB modem configuration parameters.

Nevertheless, if the same USB modem is used in multiple countries with same ISP and/or different ISPs, then the AP may not have a unique entry for that USB modem in its stored list. Therefore, conflicts may arise when the AP tries to identify the required provisioning parameters for the USB modem.

For example, FIG. 2 shows an exemplary table illustrating various ISP, country, model and their corresponding provisioning parameters according to embodiments. FIG. 2 includes at least an Internet Service Provider (ISP) field 200, a country field 210, a model field 220, and a provisioning parameters field 230. As shown in FIG. 2, the same model of USB modem may be used by different ISPs in different countries. For example, Sierra 380 is used by AT&T in the United States, and is also used by Telstra in Australia. Moreover, the provisioning parameters for the same model of USB modem are different when the USB modem is used by different ISPs or in different countries. Specifically, when Sierra 380 is used by AT&T in the United States, the following provisioning parameters shall be used:

---
usb_type=4 (sierra-gsm) usb_dev=0x0f3d68a3 usb-
dial=ATDT*99***1# usb_tty=ttyUSB6
usb_init=AT+CGDCONT=1,'IP','isp.cingular'
---

By contrast, when Sierra 380 is used by Telstra in Australia, the following provisioning parameters shall be used:

---
A usb_dev=0x119968a3 usb_dial=ATDT*99***1#
usb_init=AT+CGDCONT=1,'IP','telstra.internet'
usb_tty=ttyUSB6 usb_type=4(sierra-gsm)
---

To determine which set of provisioning parameters shall be used to configure the Sierra 380 USB modem, an AP can provide a user with configuration options for "country name" and "ISP name." In this example, the user will be prompted to choose a "country name" between "United States" and "Australia," and/or to choose an "ISP name" between "AT&T" and "Telstra." Once the user makes a selection, the AP can uniquely identify the corresponding provisioning parameters for the Sierra 380 USB modem from the stored configuration list as shown in FIG. 2. The drawback of this approach, however, is that the process relies on user input to uniquely identify the appropriate provisioning parameters for the USB modem, which is a partial "zero-touch" process.

Zero Touch USB Modem Configuration

According to embodiments of the present disclosure, an AP can automatically retrieve the country name and ISP details associated with a particular USB modem to make the USB modem provisioning process a complete zero-touch process.

A. Conflict Detection

When a USB modem is physically connected to an AP's USB port, the AP can identify a model identifier through the USB interface. Furthermore, the AP can access a stored list, which includes all supported USB modem models as well as their corresponding country names, ISP vendors, provisioning parameters, etc. Based on the model identifier, the AP can perform a lookup in the stored list. If the AP can uniquely identify an entry corresponding to the USB modem, no conflict is detected. On the other hand, if the AP cannot uniquely identify a single entry corresponding to the USB modem based on the model identifier (for example, when the same model is used in different countries and/or by different ISPs), the AP detects a conflict for the particular model. In some embodiments, the same model of the USB modem is used in multiple countries, causing a conflict in the country names. In some embodiments, the same model of the USB modem is used by multiple ISPs, causing a conflict in ISP vendors.

B. Country Name Resolution

When a conflict is detected in the country names, the AP can use one or more of the following mechanisms to resolve the conflict. First, the AP can read a flash storage of itself. Specifically, the AP can obtain the country code from the flash of the AP, which is typically manufacture-programmed as a part of the AP image. In majority of the cases, the AP is deployed at the same location (in the same country) as the USB modem. Therefore, the AP can infer the country name corresponding to the USB modem configuration from its own manufacture-programmed country code.

Second, the AP can obtain the country code from the AP's configuration. Rather than accessing the AP's own image, the AP can obtain the country code from an AP configuration parameter, such as, virtual-controller-country, etc. The AP may need to be configured with such AP configuration parameter for its own operations. The AP configuration parameter may be reset by the manufacture for the AP.

Third, the AP may listen to a wireless beacon frame. A beacon generally refers to a type of frame that is sent by a network device, such as an AP or a wireless router, to indicate that the network device is on. Specifically, the AP can listen to any wireless signals transmitted in the AP's physical vicinity. If a beacon is received by the AP, the AP can check certain fields to determine the country code. For example, IEEE 802.11d standard specifies an optional beacon element that identifies the country. This beacon element can be used by the AP to determine the country of operation when the AP receives an IEEE 802.11d beacon frame.

Fourth, the AP can initiate a query command to the USB modem, and determine the country code based on the response to the AT command received form the USB modem. For example, an AT command, such as "AT+CIMI?" on a USB modem will provide a corresponding International Mobile Subscriber Identity (IMSI) of the USB modem. FIG. 3 shows an exemplary table illustrating selected International Mobile Subscriber Identity (IMSI) code. FIG. 3 includes at least an ISP field 300, a country field 210, and a country code field 320. Here, country code 320 is an excerpt of IMSI. IMSI generally refers to an identity code that is used to identify the user of a cellular network and is a unique identification associated with all cellular networks. Typically, the IMSI is stored as a 64 bit field and is sent by a client device (e.g., a mobile phone) to the network. The IMSI is used in any mobile network that interconnects with other networks. Also, the IMSI is usually presented as a 15-digit number, but can be shorter. The first 3 digits are the mobile country code (MCC), which are followed by the mobile network code (MNC), which is either 2 digits (European standard) or 3 digits (North American standard). By analyzing the first 3 digits, the AP can determine a country code corresponding to the USB modem's location.

Further, based on the country code, the AP can determine the country name. For example, if the first 3 digits returned from the response to the AT command is "310," the AP can determine that the country name for the USB modem is the United States. If the first 3 digits returned from the response to the AT command is "234," the AP can determine that the country name for the USB modem is United Kingdom. If the first 3 digits returned from the response to the AT command is "602," the AP can determine that the country name for the USB modem is Egypt. If the first 3 digits returned from the response to the AT command is "520," the AP can determine that the country name for the USB modem is Thailand. If the first 3 digits returned from the response to the AT command is "505," the AP can determine that the country name for the USB modem is Telstra. If the first 3 digits returned from the response to the AT command is "208," the AP can determine that the country name for the USB modem is France.

C. ISP Name Resolution

ISP name can be retrieved by the AP using the AT command "AT+CIMI?." The USB modem will reply to the AT command with a 15-digit IMSI code. In addition, if there are multiple ISPs in the same country using the same USB modem, each ISP can be uniquely identified by the 4th and 5th digits of the IMSI code, which provides the mobile network code.

D. Selecting a Configuration

After the AP resolves any conflicts in country names and/or ISP names, the AP can select a unique configuration from the stored list of AP's supported modems based on the combination of the country name, the ISP name, and the device identifier. It is important to note that, the country name can be corresponding to the AP, which is a different device from which the device identifier identifies. Unlike the device identifier, the country name is not an attribute of the USB modem, because the value of the country name may change if the same USB modem product is shipped to different countries. Thus, the country name is an example of dynamic attributes whose values vary based on device deployment details. Moreover, the AP can make such selection without any user inputs and achieve complete zero touch configuration even in the presence of conflicts in country names and/or ISP names. Such zero touch configurations have not been previously achieved on conventional modem management tools, for example, on Window®, Linux®, or MAC OS. The USB modem needs to be configured by a network administrator with the ISP's APN details in order to connect to the ISP network on these platforms.

Process for Zero Touch Configuration Support for USB Modem

Figure 4:
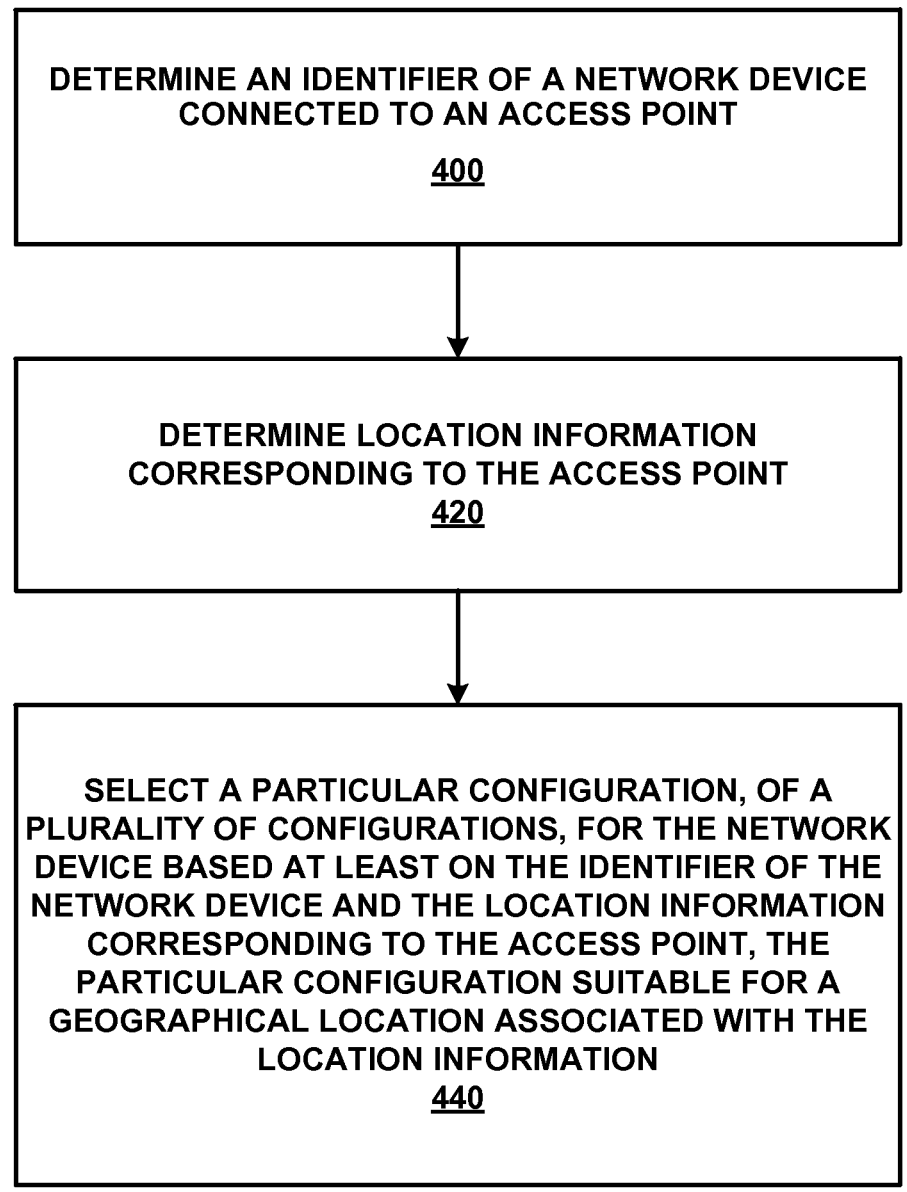
FIG. 4 shows an exemplary process for providing zero touch configuration support for USB modem according to embodiments of the present disclosure.

FIG. 4 illustrates an exemplary process for providing zero touch configuration support for the USB modem according to embodiments of the present disclosure. During operations, an access point determines an identifier of a network device connected to the access point (operation 400). Furthermore, the access point determines location information corresponding to the access point (operation 420). Then, the access point selects a particular configuration, of a plurality of configurations, for the network device based at least on the identifier of the network device and the location information corresponding to the access point. Note that, the particular configuration is suitable for a geographical location associated with the location information (operation 440). Here, the network device can be a modem, especially, a 3G/4G multi-mode USB modem device. Furthermore, the network device can be connected to the access point via a USB cable.

In some embodiments, the network device determines the location information by extracting the location information from data stored on the access point. In some embodiments, the network device determines the location information by extracting the location information from a configuration of the access point. Here, the location information can be extracted from a flash of the AP, an AP image, etc. In some embodiments, the AP determines the location information by detecting one or more wireless signals, and further determining the location information based on the detected one or more wireless signals.

In some embodiments, the AP can select a particular configuration for the USB modem based on data obtained by querying the network device. In some embodiments, the AP can select a particular configuration based on an Internet Service Provider (ISP) providing network access to the network device. Note that, the particular configuration, of the plurality of configurations, is selected without obtaining user input from a user.

Figure 5:
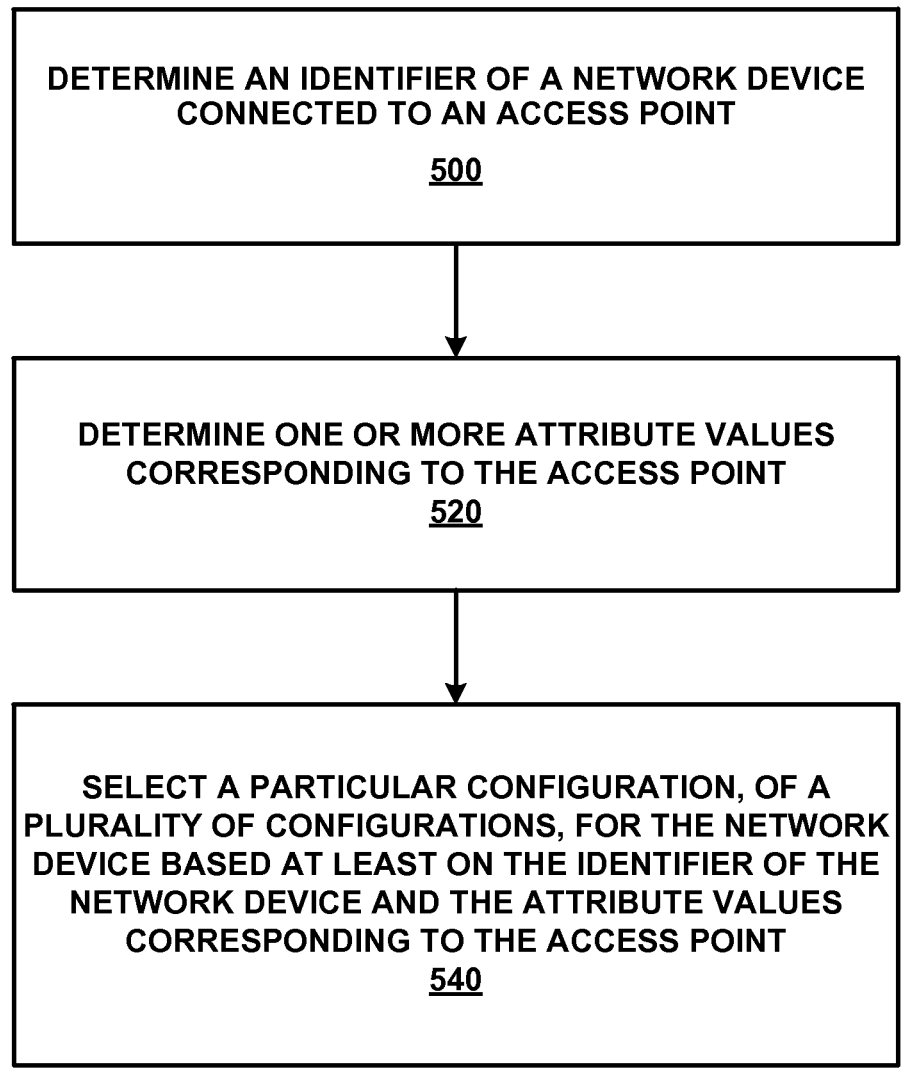
FIG. 5 shows an exemplary process for providing zero touch configuration support for USB modem according to embodiments of the present disclosure.

FIG. 5 shows an exemplary process for providing zero touch configuration support for USB modem according to embodiments of the present disclosure. During operations, an access point determines an identifier of a network device connected to the access point (operation 500). Furthermore, the access point determines one or more attribute values corresponding to the access point (operation 520). Then, the access point selects a particular configuration, of a plurality of configurations, for the network device based at least on the identifier of the network device and the attribute values corresponding to the access point (operation 540). Here, the network device can be a modem, especially, a 3G/4G multi-mode USB modem device. Furthermore, the network device can be connected to the access point via a USB cable.

In some embodiments, the one or more attribute values vary based on a deployment environment for the access point. In some embodiments, the one or more attribute values vary based on a deployment environment for the network device.

System for Zero Touch Configuration Support for USB Modem

Figure 6:
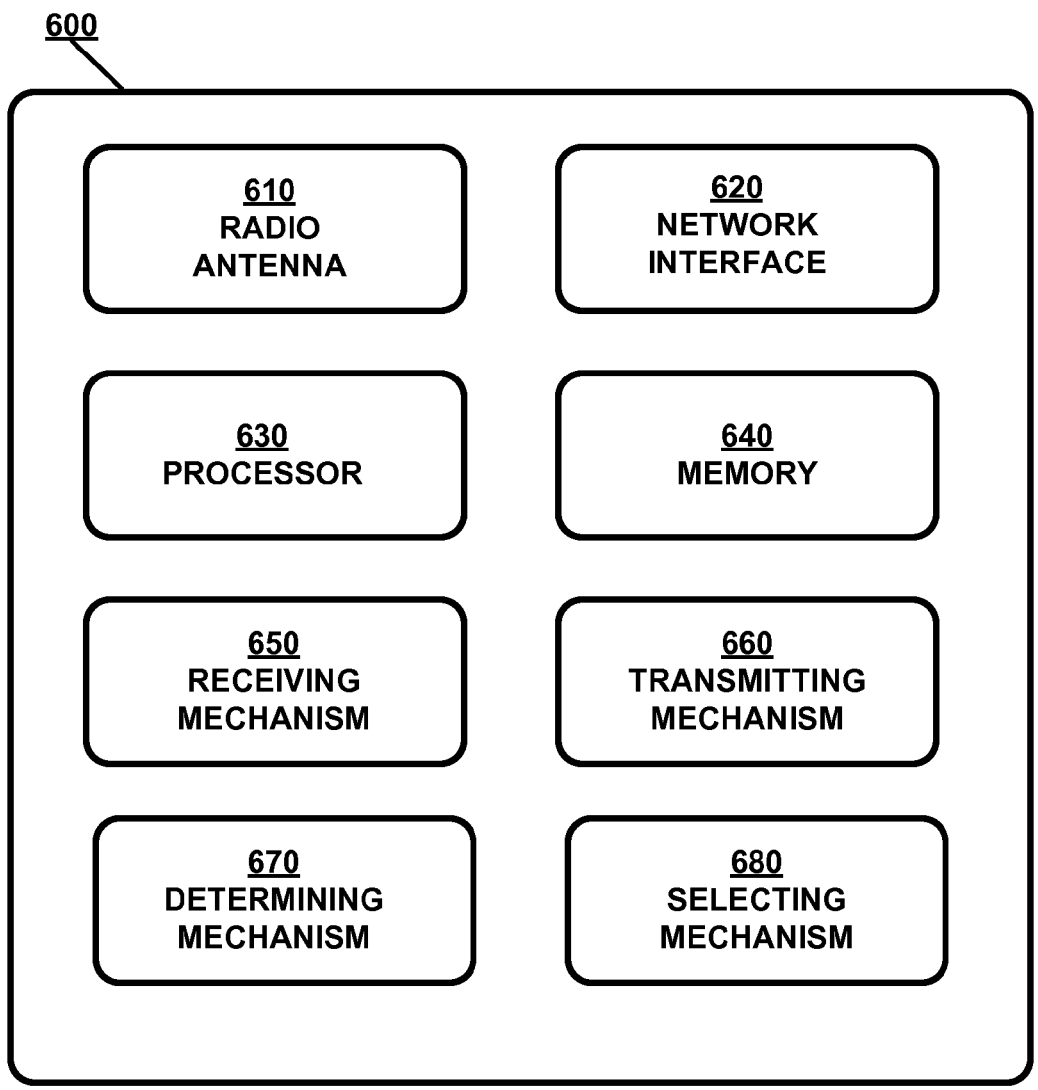
FIG. 6 is a block diagram illustrating an exemplary system for zero touch configuration support for USB modem on a network device according to embodiments of the present disclosure.

FIG. 6 is a block diagram illustrating a system for zero touch configuration support for USB modem according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, a determining mechanism 670, and a selecting mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors.

Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on.

Transmitting mechanism 660 generally transmits messages, which include, but are not limited to, requests and/or responses, beacon frames, management frames, control path frames, and so on.

Determining mechanism 670 generally determines an identifier of a network device connected to the access point. Specifically, the network device can be a modem. Moreover, the network device can be connected to the access point via a USB cable.

In some embodiments, determining mechanism 670 determines location information corresponding to the access point. For example, determining mechanism 670 may determine the location information by extracting the location information from data stored on the access point. As another example, determining mechanism 670 may determine the location information corresponding to the access point by extracting the location information from a configuration of the access point. In some embodiments, determining mechanism 670 can detect one or more wireless signals, and determine the location information based on the detected one or more wireless signals.

In some embodiments, determining mechanism 670 determines one or more attribute values corresponding to the access point. The one or more attribute values vary based on a deployment environment for the access point and/or the network device.

Selecting mechanism 680 generally selects a particular configuration, of a plurality of configurations, for the network device based at least on the identifier of the network device and the location information corresponding to the access point. Note that, the particular configuration selected for the network device is suitable for a geographical location associated with the location information.

In some embodiments, selecting mechanism 680 selects the particular configuration based on data obtained by an access point querying the network device. In some embodiments, selecting mechanism 680 selects the particular configuration based on an Internet Service Provider (ISP) providing network access to the network device. Note that, the particular configuration, of the plurality of configurations, is selected without obtaining user input from a user.

In some embodiments, selecting mechanism 680 selects a particular configuration, of a plurality of configurations, for the network device based at least on the identifier of the network device and the attribute values corresponding to the access point.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by a processor of an access point, cause the processor to:
 receive, at a USB interface, a model identifier of a modem connected to the access point;
 determine that the model identifier corresponds to more than one entry in a list of supported modem models, comprising:
  detecting a conflict between the model identifier of the modem and location information corresponding to the access point;
 resolve the detected conflict using an international mobile subscriber identity code received from the modem, comprising:
  determining whether a country name conflict exists based on a country name parameter differing among the more than one entry corresponding to the model identifier;
  upon determining that a country name conflict exists, resolving the country name conflict by:
   detecting a wireless signal,
   obtaining a country code from the detected wireless signal, and
   determining a country name of the modem based on the country code;
  determining whether an internet service provider (ISP) conflict exists based on an ISP name parameter differing among the more than one entry corresponding to the model identifier; and
  upon determining that an ISP name conflict exists, determining an ISP name of the modem by resolving the ISP conflict;

using the model identifier, the country name of the modem, and the ISP name of the modem, select a particular configuration corresponding to an entry in the list of supported modem models; and
provision the modem using the selected configuration.

2. The non-transitory computer readable medium of claim 1, wherein the instructions to select the particular configuration include instructions which, when executed by the processor, cause the processor to:
select the particular configuration based on data obtained by the access point by querying the modem.

3. The non-transitory computer readable medium of claim 1, wherein the instructions to select the particular configuration include instructions to select the particular configuration without obtaining user input from a user.

4. The non-transitory computer readable medium of claim 1, wherein the modem is connected to the access point via a USB cable.

5. A non-transitory computer readable medium comprising instructions which, when executed by a processor of an access point, cause the processor to:
receive, at a USB interface, a model identifier of a modem connected to the access point;
determine that the model identifier corresponds to more than one entry in a list of supported modem models, comprising:
detecting a conflict between the model identifier of the modem and location information of the access point;
resolve the detected conflict using an international mobile subscriber identity code received from the modem, comprising:
determining whether a country name conflict exists based on a country name parameter differing among the more than one entry;
upon determining that a country name conflict exists, resolving the country name conflict by obtaining a plurality of attribute values corresponding to the access point, wherein at least one of the plurality of attribute values includes a country code;
determining a country name based on the country code corresponding to the access point;
determining whether an internet service provider (ISP) conflict exists based on an ISP name parameter differing among the more than one entry; and
determining an ISP name of the modem by:
querying the modem for the ISP name, and
receiving a response containing the ISP name;
using the model identifier, the country name, and the ISP name, select a particular configuration corresponding to an entry in the list of supported modem models; and
provision the modem using the selected configuration.

6. The non-transitory computer readable medium of claim 5, wherein the one or more attribute values vary based on a deployment environment for the access point.

7. The non-transitory computer readable medium of claim 5, wherein the one or more attribute values vary based on a deployment environment for the modem.

8. A method comprising:
receiving a model identifier of a modem connected to an access point;
determining that the model identifier corresponds to more than one entry in a list of supported modem models, comprising:
detecting a conflict between the model identifier of the modem and location information corresponding to the access point;
resolving, by the access point, the detected conflict using an international mobile subscriber identity code received from the modem, comprising:
determining whether a country name conflict exists based on a country name parameter differing among the more than one entry corresponding to the model identifier;
upon determining that a country name conflict exists, resolving, by the access point, the country name conflict by:
detecting a wireless signal,
obtaining a country code from the detected wireless signal, and
determining a country name of the modem based on the country code;
determining whether an internet service provider (ISP) conflict exists based on an ISP name parameter differing among the more than one entry corresponding to the model identifier; and
determining an ISP name of the modem by:
querying the modem for the ISP name, and
receiving a response from the modem containing the ISP name;
using the model identifier, the country name of the modem, and the ISP name of the modem, selecting a particular configuration corresponding to an entry in the list of supported modem models; and
provisioning the modem using the selected configuration.

9. The method of claim 8, wherein the particular configuration is selected without obtaining user input from a user.

10. The non-transitory computer readable medium of claim 1, further comprising instructions which, when executed by the processor, cause the processor to:
detect a conflict between the model identifier of the modem and the ISP associated with the access point; and
resolve the detected conflict using an international mobile subscriber identity code received from the modem.

11. The non-transitory computer readable medium of claim 1, wherein the detected wireless signal is a beacon frame.

12. The non-transitory computer readable medium of claim 5, wherein querying the modem comprises sending an AT command through the USB interface of the access point to the modem.

13. The non-transitory computer readable medium of claim 5, wherein the received response from the modem is an International Mobile Subscriber Identity (IMSI) code of the modem.

14. The non-transitory computer readable medium of claim 13, wherein the ISP name is contained in a mobile network code of the IMSI code.

15. The non-transitory computer readable medium of claim 5, wherein the selected configuration is suitable for a geographical location of the modem.

16. The method of claim 8, wherein the detected wireless signal is a beacon frame.

17. The method of claim 8, wherein the received response from the modem is an International Mobile Subscriber Identity (IMSI) code of the modem.

18. The method of claim 17, wherein the ISP name is contained in a mobile network code of the IMSI code.

19. The method of claim 8, wherein querying the modem comprises sending an AT command through a USB interface of the access point to the modem.

* * * * *